Oct. 27, 1953

A. H. B. QUIST 2,657,069

COLLAPSIBLE WHEELED VEHICLE

Filed March 20, 1952

INVENTOR.
A. H. B. Quist
BY
Glascock Downing Leebld
ATTORNEYS

Oct. 27, 1953  A. H. B. QUIST  2,657,069
COLLAPSIBLE WHEELED VEHICLE
Filed March 20, 1952  2 Sheets-Sheet 2
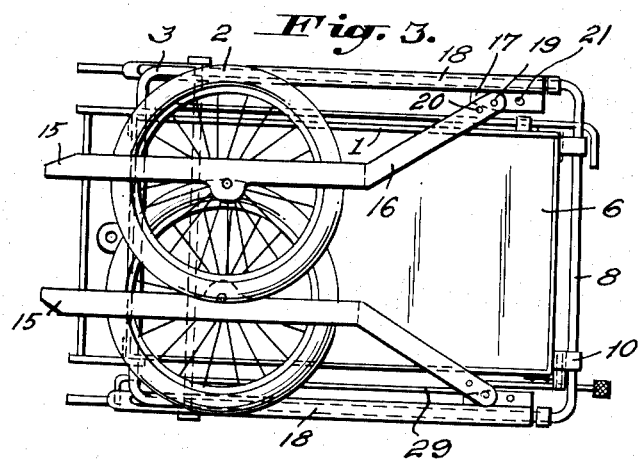
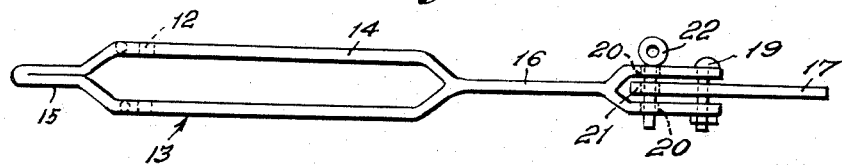
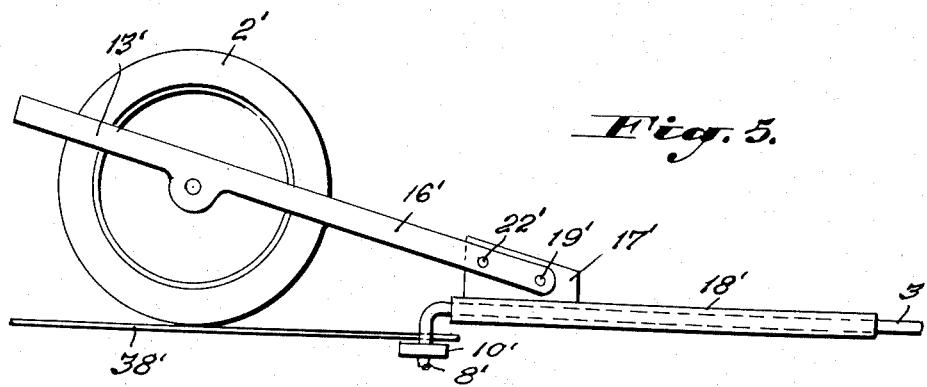
INVENTOR.
A. H. B. Quist
BY
*Glasscock Downing Dubres*
ATTORNEYS.

Patented Oct. 27, 1953

2,657,069

UNITED STATES PATENT OFFICE 2,657,069

COLLAPSIBLE WHEELED VEHICLE

Axel Harald Birger Quist, Norrkoping, Sweden

Application March 20, 1952, Serial No. 277,569
In Sweden November 1, 1950

10 Claims. (Cl. 280—40)

The present invention relates to wheeled vehicles of the so-called collapsible type and more particularly has reference to a vehicle of the two wheel type provided with means allowing the wheels to be locked in a ground engaging position with respect to the vehicle frame or moved to a position whereby the wheels are disposed and maintained in a plane substantially parallel to the plane of the load supporting surface of the vehicle to define a compact assembly thus facilitating packaging and storage of the vehicle.

Of course, I am aware that means have heretofore been devised to permit the ground wheels of a vehicle to be swung from the road engaging position to a nested position, so to say, in regard to a vehicle body in order to make the vehicle less bulky for transportation and storage purposes. While these prior assemblies are generally satisfactory, they do have one serious objectionable characteristic. To either collapse or set up the vehicle, it is necessary that three persons cooperate during the procedure to achieve the desired ends. One person must manipulate the handle or tongue and another each of the ground wheels. This is not only a time consuming operation but also expensive since so many persons are required to efficiently set up and take down the vehicle.

Accordingly, an important object of the invention is to overcome the foregoing and other disadvantageous features now present in the art.

A further object of the invention is to provide a vehicle of the two wheel type with means for swinging the wheels from the road engaging position to a position in substantial parallelism with the load supporting surface of the vehicle, such means being so constructed and arranged as to be operated easily and efficiently by a single person.

Yet a further object of the present invention is to provide a collapsible two wheeled vehicle which may be towed by a power driven vehicle in the fashion of a trailer or either pushed or pulled manually.

Still another object of the invention is to provide a vehicle of the character described including a load supporting frame, a handle pivoted to the frame for movement about a horizontal axis, wheels supported by the handle swingable about an axis parallel to the longitudinal axis of the handle to enable the wheels to be moved into road engaging position relative to the frame, complemental means on the wheel supports and frame to maintain the wheels in the road engaging position, further means on the wheel supports and handle to allow the wheels to be swung about an axis perpendicular to the longitudinal axis of the handle so that when the handle is moved about its pivot into parallelism with the load supporting frame, the wheels may also be moved into parallelism with the frame about the handle and means carried by the frame extending to a position adjacent the handle for actuating the complemental means on the wheel supports and frame.

With the above and other objects in view, the invention consists in the details of construction, and in the arrangement and combination of parts to be hereinafter more fully set forth and claimed.

In describing the invention in detail, reference will be had to the accompanying drawings forming part of this application, wherein like reference characters denote corresponding parts in the several views, and in which:

Figure 3 is a top plan view showing the handle and wheels moved into the nested or collapsed position above the load supporting surface.

Figure 4 is a fragmental top plan view of the wheel supporting arm, and

Figure 5 is a fragmentary top plan view of a slightly modified form of the wheel supporting arms.

Figure 1:
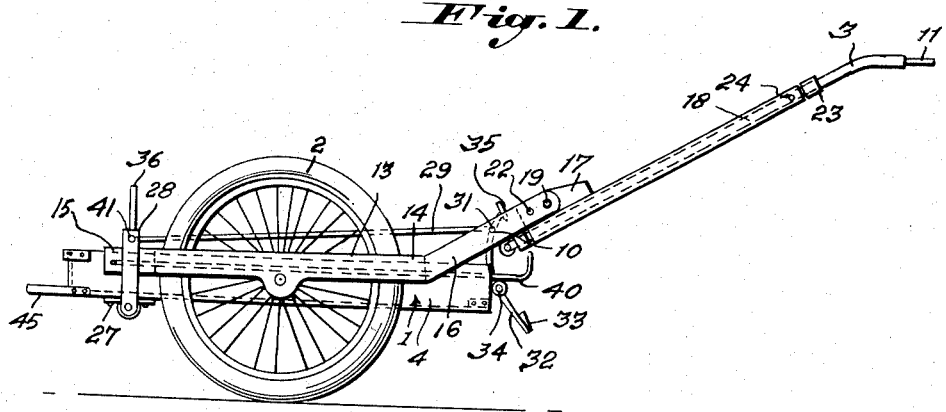
Figure 1 is a view in side elevation of a vehicle made in accordance with the inventive concept, the wheels being shown in the locked road engaging position.

The vehicle includes a frame 1, ground wheels 2 and a handle or tongue 3. The frame or box 1 is defined by side walls 4, end walls 5 and a floor or load supporting surface 6 suitably secured to the respective walls.

Figure 2:
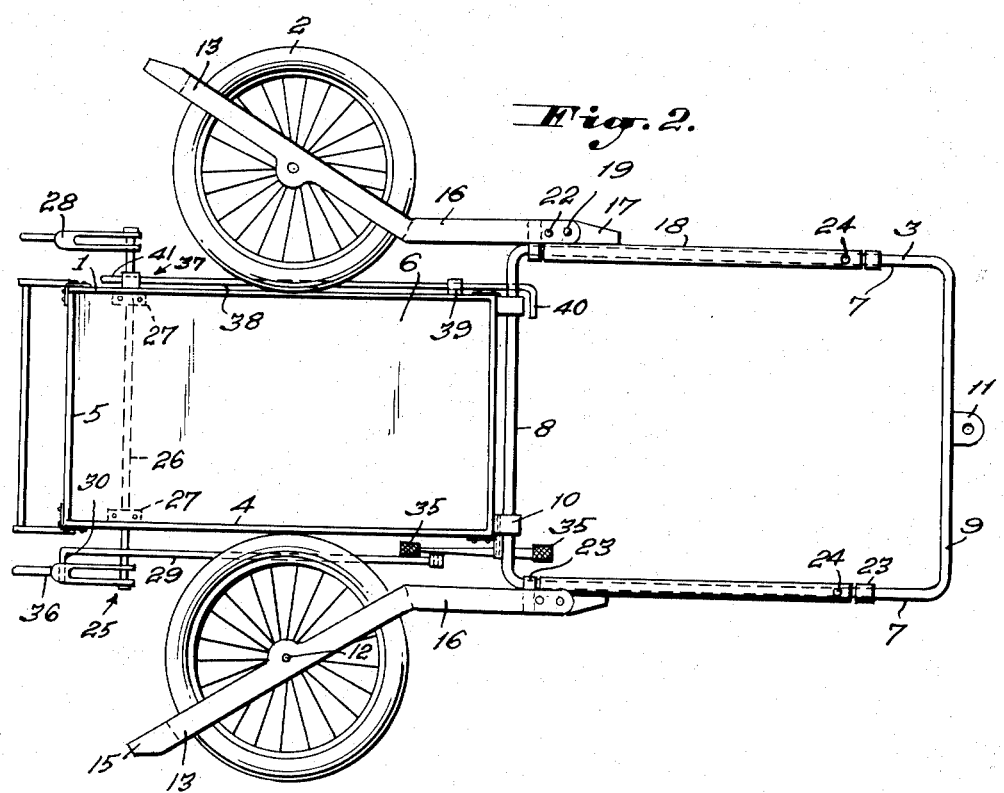
Figure 2 is a top plan view of the vehicle depicted in Figure 1, with the wheels moved from the ground engaging position into substantial parallelism with the load supporting surface of the frame.

As shown in Figure 2, the handle 3 is tubular and in the form of an elongated closed loop having side members 7 and end members 8 and 9 connected to the free ends of the side members. The end member 8 is journalled in a pair of spaced apart bearing surfaces attached to one of the end walls 5 of the frame, the bearing surfaces being identified 10, and as shown in Figure 1, these surfaces are disposed in a plane above the frame 1. Hence, it can be seen that the handle 3 may have pivotal movement about a horizontal axis with respect to the frame 1 so that the handle may be moved to a position substantially parallel to the floor 6 as will be later described.

The end member 9 of the handle is displaced angularly from the plane of the side members 7 to constitute a hand grip if the vehicle is either pushed or pulled manually. To permit the vehicle to be towed as a trailer type vehicle, the end member 9 carries an apertured lug or extension 11 projecting rearwardly from the midpoint of the end member 9. The lug 11 is adapted to be attached to a conventional coupling on the towing vehicle (not shown).

Each ground wheel 2 is journalled as at 12 in a supporting arm 13 and as depicted in Figure 4, the arm 13 is formed of two longitudinally extending spaced members 14 with the wheel mounted in the hiatus between the members. The ends of the members remote from the handle are connected together to define an extension 15 while the opposite ends of the members are attached to an angular extension 16 of the arm. The angular extension 16 is pivoted in proximity to its free end to a lug 17 projecting outwardly from an elongated sleeve 18 rotatably supported by each side member 7 of the handle. The pivot connection may be of any convenient type and is indicated 19. To prevent the arm extension from swinging freely about the pivot 19, the extension and lug are provided with apertures 20 and 21 respectively, adapted when brought into registry (Figure 2) to receive a locking pin 22 of the removable type whereby the wheels may be maintained in the positions illustrated in Figures 1 and 2.

The sleeves 18 are of lesser length than the side members 7 and to arrest longitudinal movement of the sleeves, a stop collar 23 is anchored to the side member at each end of the sleeve. To aid in turning the sleeves 18, a hand grip 24 is attached to each sleeve adjacent the upper end thereof and the grip extends perpendicularly with respect to the sleeve. With the wheels in the Figure 1 position, the grips 24 extend inwardly of the handle to enable the operator to more easily grasp and manipulate the grips for rotating the sleeves and consequently, swing the wheels 2.

Needless to say, it is essential that means be provided to maintain the wheels in the road engaging position and a locking unit 25 accomplishes this end. The unit 25 comprises a shaft 26 rotatably supported beneath the lower face of the floor 6 in proximity to the front of the frame 1 by spaced brackets 27. A stirrup 28 is anchored to each end of the shaft 26 and when the wheels are down or at right angles to the floor of the frame, the stirrups will embrace the extensions 15 of the arms 13 and thus prevent any swinging movement of the wheels relative to the frame.

To move the stirrups toward and away from the extensions 15, a connecting rod 29 is secured at one end to one of the stirrups as denoted at 30, the rod extending in spaced parallel relation to the side wall 4 of the frame 1 and the free end of the rod is pivoted at 31 to arm 32 of a pedal assembly 33. The pedal assembly 33 is mounted on the end wall of the frame in a bracket 34 attached to the end wall at its point of juncture with the side wall 4. Each end of the arm carries a tread portion 35 and with the wheels down, it will be seen that by depressing the lower tread portion to move the arm about its pivot, the rod 29 will be displaced toward the handle and thereby simultaneously swing the stirrups in an upward direction to engage the arm extensions 15. Obviously, the depression of the upper tread portion moves the rod in the other direction to swing the stirrups outwardly and downwardly away from the extensions. If desired, one or both of the stirrups may include a handle member 36 so that the stirrups can be operated independently of the pedal assembly at the front end of the frame.

As an added safety measure to ensure that the stirrups will not be moved away from the extensions 15 accidentally, a supplemental locking unit 37 is employed. The unit 37 consists of a rod 38 which is journalled in brackets 39 mounted on the opposite side wall 4, the rod extending longitudinally of the frame and provided with a grip piece 40 located near the end member 8 of the handle. The other end of the rod projects beyond the stirrup and terminates in a hook 41. When the wheels are down and the stirrups are over the extensions 15, the grip piece 40 is manipulated to turn the rod until the hook engages the stirrup and in this position, the stirrups cannot become disengaged from the extensions.

When it is desired to package or store the vehicle and with the vehicle assembled as shown in Figure 1, the rod 38 is turned to move the hook 41 out of engagement with the stirrup 28 and the upper tread portion 35 is depressed thus swinging the stirrups 28 away from the arm extensions 15 to free the wheel supporting arms 13. The handle is moved downwardly about its pivot to the frame until the floor 6 rests on the ground and by turning the sleeves 18 with the aid of the hand grips 24, the supporting arms 13 and wheels 2 can be swung outwardly until the wheels also rest on the ground. The next step is to remove the pins 22 from the apertures 20 and 21 in the extension 16 and the lug 17 so that the wheels may be moved outwardly away from the side walls of the frame 1. The handle is then swung about its pivot to the frame until it rests on the side and end walls of the frame in parallelism to the floor 6. By turning the sleeves 18 and moving the arms about the pivots 19, the wheels will be moved over the handle with one wheel above and overlapping the other wheel.

It will be appreciated that these various steps can be readily and efficiently performed by one person in a minimum of time and the vehicle when collapsed is quite compact thereby allowing several vehicles to be shipped in a single case. This is particularly important in shipments carried by water vessels where the freight charges for bulky merchandise is predicated upon cubic meter of the package. Also, the compact nature of the collapsed vehicle permits it to be easily stored and the capacity of warehouses and the like is materially increased.

For the purpose of brevity the assembly or setting up of the vehicle is not being described specifically, it being apparent that the order of the steps is reversed.

A bumper unit 45 of any desirable type may be fixed to the end wall remote from the handle for the usual purposes, and rubber hand grips (not shown) may be provided for the end member 9 on each side of the lug 11.

It should also be mentioned that the angle between the extension 16 and the arm 13 is such when the vehicle is set up for use, the arm 13 will be approximately parallel to the floor 6.

While the handle and wheels have been illustrated as swinging above and over the floor of the frame, it is manifest that the parts could be arranged to lie beneath the floor in the collapsed position. Also, by changing the configuration of the lug 17 on the sleeve, the wheel supporting arms could be straight rather than having the angular extension 16. Such a modified form of the arrangement is shown in Figure 5 wherein the extension 16' is straight, that is, in longitudinal alignment with the portions 13 and 14 with the ends fixed to the lug 17'. The reference numerals are the same as in the preferred form with the exception that they are primed.

The present invention may be embodied in other detailed forms without departing from the spirit of the concept, the specific assembly being merely illustrative and the scope of the invention being defined by the attached claims rather than the foregoing description, and all modifications which fall within the meaning and range of equivalency of the claims are intended to be covered thereby.

I claim:

1. A collapsible vehicle comprising a frame having a load supporting surface, a handle pivoted to the frame for movement about a horizontal axis, wheels supported by the handle swingable about an axis parallel to the longitudinal axis of the handle to allow the wheels to be swung from a plane perpendicular to the load supporting surface to a plane parallel to the load supporting surface, complemental means on the wheel supports and frame to maintain the wheels perpendicular to the load supporting surface whereby the wheels engage the road surface, further means on the wheel supports and handle to permit the wheels to be swung about an axis perpendicular to the longitudinal axis of the handle so that when the handle is moved about its pivot to the frame into parallelism with the load supporting surface, the wheels may also be moved into parallelism with the frame load supporting surface in spaced relation to the handle, and operating means carried by the frame operatively connected to said complemental means for actuating the said complemental means, the operating means being located adjacent the said handle.

2. A vehicle as defined in and claimed by claim 1 further characterized in that said complemental means includes a stirrup for each wheel pivoted for movement about a horizontal axis to the frame, an extension on each wheel support, the operating means being attached to the stirrup for moving the same about its pivot into engagement with the wheel support extension.

3. A vehicle as defined in and claimed by claim 1 further characterized in that latching means is supported by the frame for engaging the complemental means when the wheels are disposed in a plane perpendicular to the load supporting surface and an operating member connected to said latching means adjacent to said handle.

4. A collapsible vehicle comprising a frame having a load supporting surface, a handle pivotally connected to the frame for movement about a horizontal axis, a pair of wheels, a supporting member for each wheel, means to rotatably mount the wheel in the supporting member, means defining a pivot connection between each supporting member and the handle whereby the wheels may be swung from a plane perpendicular to the load supporting surface to a plane parallel to the load supporting surface, complemental means on the frame and each wheel supporting member to maintain the wheels perpendicular to the load supporting surface whereby the wheels engage the road surface, operating means located in proximity to the handle and operatively connected to the said complemental means to actuate the same, and further means constituting a pivot connection between each supporting member and the means defining a pivot connection between the wheel supporting member and the handle to permit the wheels to be swung about an axis perpendicular to the longitudinal axis of the handle so that when the handle is moved about its pivot to the frame into parallelism with the load supporting surface, the wheels may also be moved into parallelism with the load supporting surface in spaced relation to the handle.

5. A vehicle as defined in and claimed by claim 4 further characterized in that said means defining the pivot connection between the supporting member and the handle comprises an arm on the supporting member, a sleeve rotatable about the handle and a rigid connection between the arm and the sleeve.

6. A vehicle as defined in and claimed by claim 5 further characterized in that said further means constituting a pivot connection between each supporting member and the means defining a pivot connection between the wheel supporting member and the handle comprises a fixed pivot between the arm and the rigid connection and a removable locking unit between the arm and rigid connection so that when the locking unit is removed, the supporting member and wheel may swing about the fixed pivot.

7. A vehicle as defined in and claimed by claim 6 further characterized in that said handle is an elongated closed loop of tubular form, the said sleeves being rotatable about the long legs of the loop.

8. A vehicle as defined in and claimed by claim 4 further characterized in that said complemental means includes a stirrup for each wheel pivoted to the frame for movement about a horizontal axis with respect to the frame, an extension on each wheel supporting member, the operating means being connected to the stirrup for moving the stirrup about its pivot into engagement with the extension on the wheel supporting member.

9. A vehicle as defined in and claimed by claim 8 further characterized in that each stirrup is supported by a shaft secured to the frame whereby the stirrups move in unison.

10. A vehicle as defined in and claimed by claim 9 further characterized in that one of said stirrups is provided with a hand grip for moving the stirrups about their pivots independently of the operating means.

AXEL HARALD BIRGER QUIST.

References Cited in the file of this patent

UNITED STATES PATENTS

| Number | Name | Date |
|---|---|---|
| 887,858 | Smith | May 19, 1908 |
| 919,880 | Kaufmann et al. | Apr. 27, 1909 |
| 1,409,838 | Emery et al. | Mar. 14, 1922 |

FOREIGN PATENTS

| Number | Country | Date |
|---|---|---|
| 619,397 | Great Britain | Mar. 9, 1949 |